United States Patent
Schrey et al.

(10) Patent No.: US 6,171,365 B1
(45) Date of Patent: Jan. 9, 2001

(54) PROCESS FOR THE PRODUCTION OF LIQUID PIG IRON OR LIQUID INTERMEDIATE PRODUCTS OF LIQUID STEEL AND SPONGY METAL

(75) Inventors: Günter Schrey, Linz; Herbert Grünbacher, St. Marien; Gerald Rosenfellner, St. Peter, all of (AT)

(73) Assignee: Voest-Alpine Industrieanlagenbau GmbH, Linz (AT)

(*) Notice: Under 35 U.S.C. 154(b), the term of this patent shall be extended for 0 days.

(21) Appl. No.: 09/142,186
(22) PCT Filed: Mar. 3, 1997
(86) PCT No.: PCT/AT97/00043
  § 371 Date: Sep. 2, 1998
  § 102(e) Date: Sep. 2, 1998
(87) PCT Pub. No.: WO97/33004
  PCT Pub. Date: Sep. 12, 1997

(30) Foreign Application Priority Data
  Mar. 5, 1996 (AT) .......................................... 415/96

(51) Int. Cl.[7] ................. C21B 11/00; C22B 7/02
(52) U.S. Cl. ................................. 75/492; 75/961
(58) Field of Search ........................ 75/492, 961

(56) References Cited

U.S. PATENT DOCUMENTS 5,397,376 * 3/1995 Greenwalt ............................. 75/492
5,514,203 * 5/1996 Grunbacher et al. .................. 75/961

FOREIGN PATENT DOCUMENTS

| 376241 | 10/1984 | (AT) . |
|---|---|---|
| 396255 | 7/1993 | (AT) . |
| 400725 | 3/1996 | (AT) . |
| 4037977 | 6/1992 | (DE) . |
| 4123626 | 1/1993 | (DE) . |
| 0183677 | 6/1986 | (EP) . |
| 0623684 | 11/1994 | (EP) . |
| 0676478 | 10/1995 | (EP) . |

* cited by examiner

Primary Examiner—Melvyn Andrews
(74) Attorney, Agent, or Firm—Ostrolenk, Faber, Gerb & Soffen, LLP

(57) ABSTRACT

In a method for producing liquid pig iron (16) and a sponge metal from charging substances comprising iron ore (4) respectively metal ore, the charging substances are directly reduced to sponge iron in at least one first reduction zone (2) the sponge iron is melted in a melt-down gasifying zone (15) under the supply of carbon carriers (10) and oxygen-containing gas and a CO— and $H_2$-containing reducing gas is produced which is fed to the first reduction zone (2), is reacted there and withdrawn as a top gas, wherein the withdrawn top gas after a scrubbing operation is subjected to $CO_2$ elimination and optionally to heating and is supplied to at least one further reduction zone (27) for the direct reduction of metal ore, in particular of iron ore (26), as a reducing gas that is at least largely free from $CO_2$ and after reaction with the metal ore (26) is withdrawn as an export gas and purified in a scrubber. In order to exploit the sludges incurring in the scrubbers while expending as little energy as possible, the sludges obtained in the scrubbing of the top gas from the first reduction zone (2) are dewatered and charged into the melter gasifier (15), whereas the sludges obtained in the scrubbing of the export gas of the further reduction zone (27) are dewatered and fed into the first direct reduction zone (2).

8 Claims, 1 Drawing Sheet

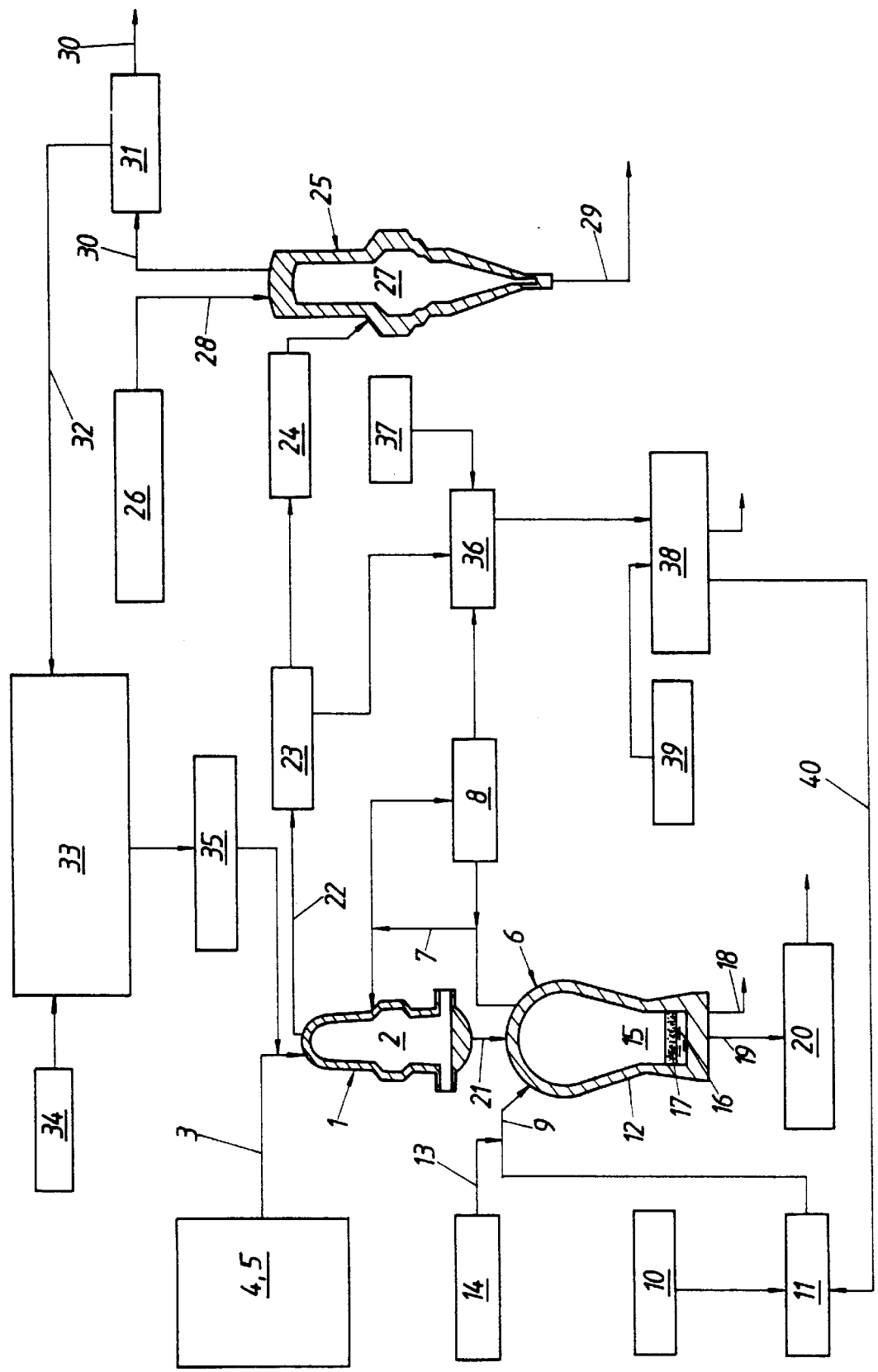

PROCESS FOR THE PRODUCTION OF LIQUID PIG IRON OR LIQUID INTERMEDIATE PRODUCTS OF LIQUID STEEL AND SPONGY METAL

The invention relates to a method for producing liquid pig iron or liquid steel pre-products and sponge metal, in particular sponge iron, from charging substances comprising iron ore respectively metal ore, preferably in lumps and/or pellets, and optionally fluxes, wherein the charging substances are directly reduced to sponge iron in at least one first reduction zone, the sponge iron is melted in a melt-down gasifying zone under the supply of carbon carriers and oxygen-containing gas and a CO— and $H_2$-containing reducing gas is produced which is fed to the first reduction zone, is reacted there and withdrawn as a top gas, and wherein the withdrawn top gas after a scrubbing operation is subjected to $CO_2$ elimination and optionally to heating and is supplied to at least one further reduction zone for the direct reduction of metal ore, in particular of iron ore, as a reducing gas that is at least largely free from $CO_2$ and after reaction with the metal ore is withdrawn as an export gas and purified in a scrubber, and a plant for carrying out the method.

Both in the scrubbing of the export gas from the first reduction zone and in the scrubbing of the export gas of the further reduction zone, sludges incur that contain iron both in oxidic form and in metallic form and optionally coal dust as well. These sludges constitute wastes or residues the metallurgical industry aims to exploit. It is known to dispose of the sludges in dumps, which can be advantageous in particular in hot climate zones, where the sludges will dry off rapidly. As the sludges do not contain any toxic substances, their disposal in dumps or landfills can be regarded as safe. If possible, the disposal of the sludges in dumps or landfills and the resulting loss of the valuable substances they contain is to be avoided and any processing of such sludges should involve as little expenditure of energy as possible while exploiting the valuable substances in an optimum manner.

A method of exploiting wastes and residues containing iron in oxidic and/or iron in metallic form or containing carbon is known from AT-B-376.241. In this method, solid particles are separated from the reducing gas as well as from the topgas exiting the direct reduction zone in cyclones and the separated solids are mixed with a binding agent, such as iron oxide dust, briquetted and fed exclusively to the melt-down gasifying zone, wherein the iron oxide dust originates in a blast furnace purification plant so that the solids incurring in the gas purification plant can be utilized as well.

A disadvantage associated with this method is that the feeding of iron oxides into the melter gasifier renders it necessary to do reduction work in order to reduce the iron oxide, whereby energy needed for the reduction process is withdrawn from the same.

From DE-A-41 23 626 it is known to agglomerate residues from the iron and steelmaking industries without distinguishing between oxidic and metallic portions, with the assistance of binding agents, slagformers and reducing agents, and to charge the agglomerates to the upper charging area of a melting aggregate, the preheating and drying of the agglomerates being effected in said charging area of the melting aggregate. The charge permeates the melting aggregate in accordance with the counter current principle, wherein it first passes into a reducing area provided inside the melting aggregate and subsequently is melted in the lower area of the melting aggregate.

This known method involves a high energy demand, as the metallic wastes or residues also have to travel through the reducing area of the melting aggregate.

From EP-A-0 623 684 it is known to collect wastes and residues containing coal dust and iron in metallic and oxidic form in three separate groups, according to their chemical composition, namely with the first group mainly containing iron in oxidic form, the second group mainly containing iron in metallic form and the third group mainly containing carbon-containing substances. Processing is effected in such a way that the substances of the first group are charged to the direct reduction zone and the substances falling into the second and third groups are charged directly into the melt-down gasifying zone.

This method has proved particularly valuable if the wastes and residues arise separately in terms of the above-mentioned different substances, i.e. in groups. Sorting of the wastes and residues from the iron and steelmaking industries, if iron in oxidic and iron in metallic form and carbon incur as mixtures, would be too expensive.

In EP-A-676 478 there is described a direct reduction process utilizing a direct reduction reactor and a melter gasifier, with the dusts separated from the reducing gas of the melter gasifier and from the topgas of the direct reduction reactor in the form of sludges being dewatered, granulated and then charged to the melter gasifier.

The invention aims at further developing the known methods in such a way as to enable the simple and efficient exploitation of the sludges incurring with the above-mentioned method of producing liquid pig iron or liquid steel pre-products and sponge metal, namely in a particularly efficient manner and at the minimum possible expenditure of energy, by directly using them for carrying out the method, wherein sorting or separation by groups according to chemical composition is, however, to be avoided.

Followed by pages 3 ff. [Translator's note: the page number refers to the German text]

Advantageously, the sludges obtained from the first reduction zone are granulated after dewatering and the granulates thus formed are charged into the melt-down gasifying zone, whereas the sludges incurring in the scrubbing of the top gas of the further reduction zone are briquetted upon dewatering and the briquettes thus formed are introduced into the first direct reduction zone.

To be able to perfectly granulate the sludges obtained from the first reduction zone—thus producing granulates of sufficient strength—such sludges are mixed with a binding agent, such as calcined lime, after dewatering. The further dewatering that is hereby effected makes it feasible to adjust a residual moisture of roughly 20%, which is particularly suitable for granulation.

The sludges from the further reduction zone are, after dewatering, commingled with dry oxidic by-products (34), such as rubbed-off ore parts and/or foundry dusts. Hereby a residual moisture of roughly 4% can be achieved which is advantageous for the subsequent briquetting operation. Suitably, said operation is a cold-briquetting operation.

In addition to the above-cited measures it is advantageous to scrub at least a portion of the reducing gas exiting the melt-down gasifying zone and subject any sludges separated in the process to further treatment along with the sludges from the first reduction zone.

A plant for producing liquid pig iron or liquid steel pre-products and sponge metal, in particular sponge iron, from charging substances comprising iron ore respectively metal ore, preferably in lumps and/or pellets, and optionally fluxes, comprising at least one first reduction reactor for iron ore, a melter gasifier, a feed duct for a reducing gas formed inside the melter gasifier connecting the melter gasifier with the first reduction reactor, a conveying duct for the reduction product formed inside the first reduction reactor connecting the first reduction reactor with the melter gasifier, a top-gas discharge duct departing from the first reduction reactor and provided with a first scrubber, feed ducts for carbon carriers and oxygen-containing gases opening into the melter gasifier, a tap for pig iron and slag provided at the melter gasifier and comprising at least one additional reduction reactor for receiving metal ore, in particular further iron ore, a reducing-gas feed duct leading to said reduction reactor, a top-gas discharge duct equipped with a scrubber and departing from this further reduction reactor, and comprising a discharging means for the reduction product formed in said further reduction reactor, with the top-gas discharge duct of the first reduction reactor opening into a $CO_2$ elimination plant from which the reducing-gas feed duct of the additional reduction reactor departs and optionally runs into the additional reduction reactor via a heating means, characterized in that a sludge discharge duct from the first scrubber leads to a sludge drying means and the sludge drying means via a conveying means is connected with the melter gasifier and that furthermore a sludge discharge duct leads from the second scrubber to a sludge drying means connected with the first reduction reactor via a conveying means.

A preferred embodiment is characterized in that from the sludge drying means allocated to the first scrubber a conveying duct leads to a granulating means and from there a conveying means runs to the melter gasifier, and that furthermore from the sludge drying means allocated to the second scrubber a conveying duct leads to a briquetting means and from there a conveying means leads to the first reduction reactor.

Suitably, in the reducing-gas feed duct opening into the first reduction reactor a scrubber is provided for at least a portion of the reducing gas, from which a sludge discharge duct departs that runs into the sludge drying means allocated to the first scrubber.

BRIEF DESCRIPTION OF THE DRAWING

The drawing appended hereto is a schematic representation of an exemplary embodiment of a plant according to the invention.

In the following, the invention will be explained in a more detailed manner in conjunction with the drawing.

In accordance with the drawing, lumpy iron-oxide-containing charging substances 4, such as ore, optionally along with uncalcined fluxes 5 are topcharged into a direct reduction reactor that is constructed as a shaft furnace 1, i.e. into the fixed-bed direct reduction zone 2 of the same, through a feed duct 3. The shaft furnace 1 is in communication with a melter gasifier 6 in which a reducing gas is produced from carbon carriers and oxygen-containing gas and is through a feed duct 7 fed to a shaft furnace 1 through which it flows countercurrent to the charging substances 4. In the feed duct 7 there is provided a gas purifying and gas cooling means 8 constructed as a scrubber, through which at least a partial stream of the reducing gas is conducted with a view to adjusting the temperature.

The melter gasifier 6 is provided with a feed duct 9 for solid, lumpy carbon carriers 10 which are supplied to the melter gasifier 6 via a coal drying plant 11, with feed ducts 12 for oxygen-containing gases and optionally with feed ducts 13 for calcined fluxes 14. Inside the melter gasifier 6, molten pig iron 16 and molten slag 17 collect below the melt-down gasifying zone 15 and are tapped off through a separate tap 18, 19 each. The pig iron 16 is supplied to a steelworks and the slag to a granulating means 20.

The lumpy charging substances reduced to sponge iron in the direct reduction zone 2 inside the shaft furnace 1 are conducted to the melter gasifier 6 through one or several conveying ducts 21, f.i. by means of discharge worms. To the upper portion of the shaft furnace 1, a discharge duct 22 is connected for the top gas forming in the direct reduction zone 2. To free it from dust and water vapor, such top gas is fed to a gas purifying means 23 likewise constructed as a scrubber, is subsequently subjected to $CO_2$ elimination, f.i. in a $CO_2$ scrubber 24 or a reformer, and is then, as a reducing gas, available to a further reduction reactor 25 that serves for receiving metal ore—in the illustrated exemplary embodiment for receiving iron ore 26. Optionally such reducing gas is subjected to heating before it is introduced into the further reduction reactor, but this option is not illustrated in the exemplary embodiment.

The further reduction reactor 25 is also constructed as a shaft furnace and like the first shaft furnace 1 is also operated in accordance with the counter current principle. In this second shaft furnace 25, iron ore in lumps and/or pellets is also directly reduced to sponge iron in a fixed-bed direct reduction zone 27. The ore feed duct is designated by numeral 28 and the sponge-iron discharging means by numeral 29.

The top gas withdrawn from the second reduction reactor 25 through the duct 30 is likewise subjected to purification and cooling in a top gas scrubber 31, to purify it from dust particles and reduce the water vapor content, whereupon it can be conducted onwards as an export gas for further use.

The sludges incurring in the top gas scrubber 31 via a duct 32 are conducted to a sludge drying means, such as a dewatering plant 33.

A composition of the sludges incurring in the scrubber 31 is shown in the following Table.

TABLE 1

| | |
|---|---|
| $Fe_2O_3$ | 64% |
| FeO | 20% |
| Fe met. | 8% |
| $Al_2O_3$ | 2% |
| $SiO_2$ | 1% |
| CaO | 1% |
| Balance* | 4% |

*Metal oxides below 1% each

The dewatered sludges are mixed with dry oxidic by-products 34, such as rubbed-off ore parts and foundry dusts, such that a residual moisture of roughly 4% adjusts. This mixture containing sludges and the by-products is subsequently fed to a briquetting plant 35 in which it is cold-briquetted. The briquettes are then charged into the shaft furnace 1 for direct reduction, preferably mixed with the ore 4, through the feed duct 3.

The sludges arising in the scrubber 8 in the scrubbing of the reducing gas which is conducted to the first shaft furnace 1 are conducted to a sludge drying means 36, f.i. decanter centrifuges, along with the sludges incurring in the scrubber 23, to achieve a residual moisture of roughly up to 35%.

A chemical composition of the sludges fed to the sludge drying plant from the scrubbers 8 and 23 is shown in the following Table 2.

TABLE 2

| | |
|---|---|
| $Fe_2O_3$ | 20% |
| FeO | 6% |
| Fe met. | 2% |
| C | 48% |
| $SiO_2$ | 10% |
| $Al_2O_3$ | 6% |
| CaO | 2% |
| MgO | 2% |
| Balance* | 4% |

*Metal oxides below 1% each

To further reduce the residual moisture to roughly 20%, calcined lime 37 is added to the dewatered sludges to act as a binding agent. Subsequently, granulation is effected in a granulating means 38, wherein optionally coal dust 39 is also added to the charging material.

Of this granulate, preferably 10% are put at the disposal of the cement industry. The balance of the granulate is conducted to the melter gasifier 6 via the conveying means 40 and the coal drying means 11.

The invention makes it feasible to utilize all of the dusts obtained from a direct reduction effected by means of two shaft furnaces 1 and 25 that are coupled with one another, in a recycling process that is particularly ecological as well as economical and in which the iron can be present in oxidic or metallic form. With this process, the material and energy contents of the dusts are exploited in an optimum manner, which is also true for the incurring coal dusts and generally for coal dusts arising in metallurgical operations.

What is claimed is:

1. Method for producing liquid pig iron (16) or liquid steel pre-products and sponge metal from charging substances comprising iron ore (4) and optionally fluxes (5), comprising directly reducing the charging substances to sponge iron in at least one first reduction zone (2), melting the sponge iron in a melt-down gasifying zone (15) under the supply of carbon carriers (10) and oxygen-containing gas, thereby producing a CO— and $H_2$-containing reducing gas, feeding said reducing gas to the first reduction zone (2) reacting it and withdrawing it as a top gas, subjecting the withdrawn top gas to a scrubbing operation in a first scrubber (8) to remove water containing sludges, further subjecting the top gas to $CO_2$ elimination and optionally to heating and supplying it to at least one further reduction zone (27) for the direct reduction of metal ore (26), as a reducing gas that is at least largely free from $CO_2$ and after reaction with the metal ore (26) withdrawing it as an export gas and purifying it in a second scrubber (31) to further remove water containing sludges, the sludges obtained in scrubbing the top gas from the first reduction zone (2) being dewatered and charged into the melter gasifier (15), and the sludges obtained in the scrubbing of the export gas of the further reduction zone (27) being dewatered and fed into the first direct reduction zone (2).

2. Method according to claim 1, characterized in that the sludges obtained from the first reduction zone (2) are granulated after dewatering and the granulates thus formed are charged into the melt-down gasifying zone (15), whereas the sludges incurring in the scrubbing of the top gas of the further reduction zone (27) are briquetted upon dewatering and the briquettes thus formed are introduced into the first direct reduction zone (2).

3. Method according to claim 1, characterized in that the sludges incurring in the scrubbing of the top gas from the first reduction zone (2), after the first dewatering operation are mixed with a binding agent (37).

4. Method according to claim 3, wherein the binding agent (37) is calcined lime and the residual water content of the sludges is thereby adjusted to about 20%.

5. Method according to claim 1, characterized in that the sludges incurring in the scrubbing of the top gas of the further reduction zone (27) are, after dewatering, commingled with dry oxidic by-products (34).

6. Method according to claim 5, characterized in that the addition of oxidic by-products (34) is carried out up to a residual water content of the sludges of about 4%.

7. Method according to claim 1, characterized in that at least a portion of the reducing gas exiting the melt-down gasifying zone (15) is scrubbed and any sludges separated in the process are subjected to further treatment along with the sludges from the first reduction zone (2).

8. Method according to claim 5, wherein the dry oxidic by-products (34) are rubbed-off ore parts and/or foundry dusts.

* * * * *